(12) United States Patent
Emerson et al.

(10) Patent No.: US 8,370,468 B2
(45) Date of Patent: *Feb. 5, 2013

(54) METHOD AND APPARATUS FOR CREATING A SECURE EMBEDDED I/O PROCESSOR FOR A REMOTE SERVER MANAGEMENT CONTROLLER

(75) Inventors: Theodore F. Emerson, Houston, TX (US); Robert L. Noonan, Crystal Lake, IL (US); David Heinrich, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1378 days.

This patent is subject to a terminal disclaimer.

(21) Appl. No.: 11/594,633

(22) Filed: Nov. 8, 2006

(65) Prior Publication Data
US 2007/0083719 A1 Apr. 12, 2007

Related U.S. Application Data

(63) Continuation of application No. 10/037,680, filed on Jan. 4, 2002.

(51) Int. Cl.
*G06F 15/177* (2006.01)
(52) U.S. Cl. ............ 709/222; 709/223; 709/225; 710/1; 710/200
(58) Field of Classification Search .................. 709/220, 709/223, 224; 710/10, 14, 17–19, 23, 36, 710/48, 59, 200
See application file for complete search history.

(56) References Cited

U.S. PATENT DOCUMENTS

| 4,823,290 | A * | 4/1989 | Fasack et al. ............ 340/825.01 |
| 5,560,023 | A | 9/1996 | Crump et al. |
| 5,752,044 | A * | 5/1998 | Crump et al. ................. 713/323 |
| 5,781,770 | A | 7/1998 | Byers et al. |
| 5,790,895 | A | 8/1998 | Krontz et al. |
| 5,860,028 | A | 1/1999 | Pecore |
| 5,898,861 | A | 4/1999 | Emerson et al. |
| 6,193,422 | B1 * | 2/2001 | Belt et al. ....................... 713/320 |
| 6,476,854 | B1 | 11/2002 | Emerson et al. |
| 6,496,940 | B1 | 12/2002 | Horst et al. |
| 6,625,729 | B1 | 9/2003 | Angelo et al. |
| 6,625,730 | B1 | 9/2003 | Angelo et al. |
| 6,636,929 | B1 | 10/2003 | Frantz et al. |
| 6,664,969 | B1 | 12/2003 | Emerson et al. |
| 7,073,064 | B1 | 7/2006 | Angelo et al. |
| 2003/0177216 | A1 | 9/2003 | Sutherland et al. |

OTHER PUBLICATIONS

Compaq Remote System Management for Industry-Standard Servers, Compaq Computer Corporation Technology Brief, Sep. 2001.
Remote Server Management with Integrated Remote Console, Compaq Computer Corporation Technology Brief, Oct. 21, 1996.

* cited by examiner

*Primary Examiner* — Thu Ha Nguyen

(57) ABSTRACT

The present invention relates to providing a secure computing environment in a remote server management controller. The exemplary embodiment includes a hierarchy of register security levels restricting register access by communications interfaces shared by the remote server management controller and a managed server associated therewith. Failsafe protection is provided to override register security under certain conditions.

20 Claims, 4 Drawing Sheets

METHOD AND APPARATUS FOR CREATING A SECURE EMBEDDED I/O PROCESSOR FOR A REMOTE SERVER MANAGEMENT CONTROLLER

CROSS-REFERENCE TO RELATED APPLICATION

This application is a continuation of U.S. patent application Ser. No. 10/037,680 by Theodore F. Emerson, Robert L. Noonan, and David Heinrich, entitled "Method and Apparatus for Creating A Secure Embedded I/O Processor for A Remote Server Management Controller," filed on Jan. 4, 2002, incorporated herein by reference.

BACKGROUND OF THE INVENTION

1. Field of the Invention

This invention relates generally to monitoring and correcting failure conditions in networked computer systems in a secure manner and, more particularly, to providing memory locations that cannot be tampered with by rouge software programs.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Since the introduction of the first personal computer ("PC") over 20 years ago, technological advances to make PCs more useful have continued at an amazing rate. Microprocessors that control PCs have become faster and faster, with operational speeds eclipsing the gigahertz (one billion operations per second) and continuing well beyond.

Productivity has also increased tremendously because of the explosion in development of software applications. In the early days of the PC, people who could write their own programs were practically the only ones who could make productive use of their computers. Today, there are thousands and thousands of software applications ranging from games to word processors and from voice recognition to web browsers.

In addition to improvements in PC hardware and software generally, the technology for making computers more useful by allowing users to connect PCs together and share resources between them has also seen rapid growth in recent years. This technology is generally referred to as "networking." In a networked computing environment, PCs belonging to many users are connected together so that they may communicate with each other. In this way, users can share access to each other's files and other resources, such as printers. Networked computing also allows users to share internet connections, resulting in significant cost savings. Networked computing has revolutionized the way in which business is conducted across the world.

Not surprisingly, the evolution of networked computing has presented technologists with some challenging obstacles along the way. One obstacle is connecting computers that use different operating systems ("OSes") and making them communicate efficiently with each other. Each different OS (or even variations of the same OS from the same company) has its own idiosyncrasies of operation and configuration. The interconnection of computers running different OSes presents significant ongoing issues that make day-to-day management of a computer network challenging.

Another significant challenge presented by the evolution of computer networking is the sheer scope of modern computer networks. At one end of the spectrum, a small business or home network may include a few client computers connected to a common server, which may provide a shared printer and/or a shared internet connection. On the other end of the spectrum, a global company's network environment may require interconnection of hundreds or even thousands of computers across large buildings, a campus environment or even between groups of computers in different cities and countries. Such a configuration would typically include a large number of servers, each connected to numerous client computers.

Further, the arrangements of servers and clients in a larger network environment could be connected in any of an infinite number of topologies that may include local area networks ("LANs"), wide area networks ("WANs") and municipal area networks ("MANs"). In these larger networks, a problem with any one server computer (for example, a failed hard drive, failed network interface card or OS lock-up to name just a few) has the potential to interrupt the work of a large number of workers who depend on network resources to get their jobs done efficiently. Needless to say, companies devote a lot of time and effort to keeping their networks operating trouble-free to maximize productivity.

An important aspect of efficiently managing a large computer network is to maximize the amount of analysis and repair that can be performed remotely (for example, from a centralized administration site). Tools that facilitate remotely analyzing and servicing server problems help to control network management costs by reducing the number of network management personnel required to maintain a network in good working order. Remote server management also makes network management more efficient by reducing the delay and expense of analyzing and repairing network problems. Using remote management tools, a member of the network management team may identify problems and, in some cases, solve those problems without the delay and expense that accompanies an on-site service call to a distant location.

The growth of modern computer systems and the need to communicate remotely with servers on such a vast geographic scale has, unfortunately, resulted in some unintended negative consequences. Large, geographically diversified computer networks are susceptible to attacks by hackers who desire to gain access to information stored on those computer networks. Such hackers are sometimes motivated by nothing more than the pride they feel when they accomplish a difficult and technically challenging goal in the face of significant efforts to repel their efforts. Sadly, however, many hackers seek to compromise network security for material gain.

The data stored on modern computer networks ranges from military and corporate secrets to personal information, including social security numbers, bank records or information about credit card accounts. This information is obviously very valuable. If a conniving hacker successfully breaks into a network environment where such data is stored, the hacker may use the data directly or sell it to others who would not hesitate to use the information to the disadvantage of its rightful owner. The theft of supposedly secure data could subject the company that stored the data to falling customer confidence resulting in declining business opportunities. Failure to adequately protect the confidential information of others can even give rise to legal liability in some cases.

The complexity of modern computer networks and the equipment that comprises those networks provides hackers with many, many avenues to access secured data. Hackers frequently seek to take advantage of operational quirks of computer hardware and software (such as browser software) that the designers of that hardware or software did not intend or foresee. Even aspects of computer equipment that are intended to provide new features and additional security give imaginative hackers opportunities to compromise network security and steal confidential data.

Remote server management tools that communicate with network servers are a favorite target of hackers' attention. This is true because remote server management tools often have the capability to give a user broad access rights to network servers. Server management requires broad network access rights of the type typically possessed by network administrators who have access to even the most sensitive data stored on a server.

A common practice employed by hackers is to obtain access to a network and eavesdrop or "snoop" communications until they identify a communication that is likely to be a network management communication. Hackers may attempt to compromise security of a system by gaining access to information that is stored in the memory of an associated remote server management tool. The data stored in registers or other memory of the remote server management tool may be usable to facilitate access to the server associated with the remote server management tool. If a knowledgeable hacker is able to compromise a management communication with a server, the hacker will undoubtedly have a much greater chance to gain access to sensitive data stored on that server.

Nonetheless, prevention of access to registers or memory of a remote server management tool may present a different set of problems. For example, the remote server management controller may experience an operational failure. If there is no way to gain access to or alter important data stored in the registers and other memory of the remote server management controller, it may be impossible to effectively repair the remote server management controller. A way to provide security for the memory space of a remote server management controller while allowing access to secured memory under certain conditions is highly desirable.

BRIEF DESCRIPTION OF THE DRAWINGS

Certain advantages of the invention may become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
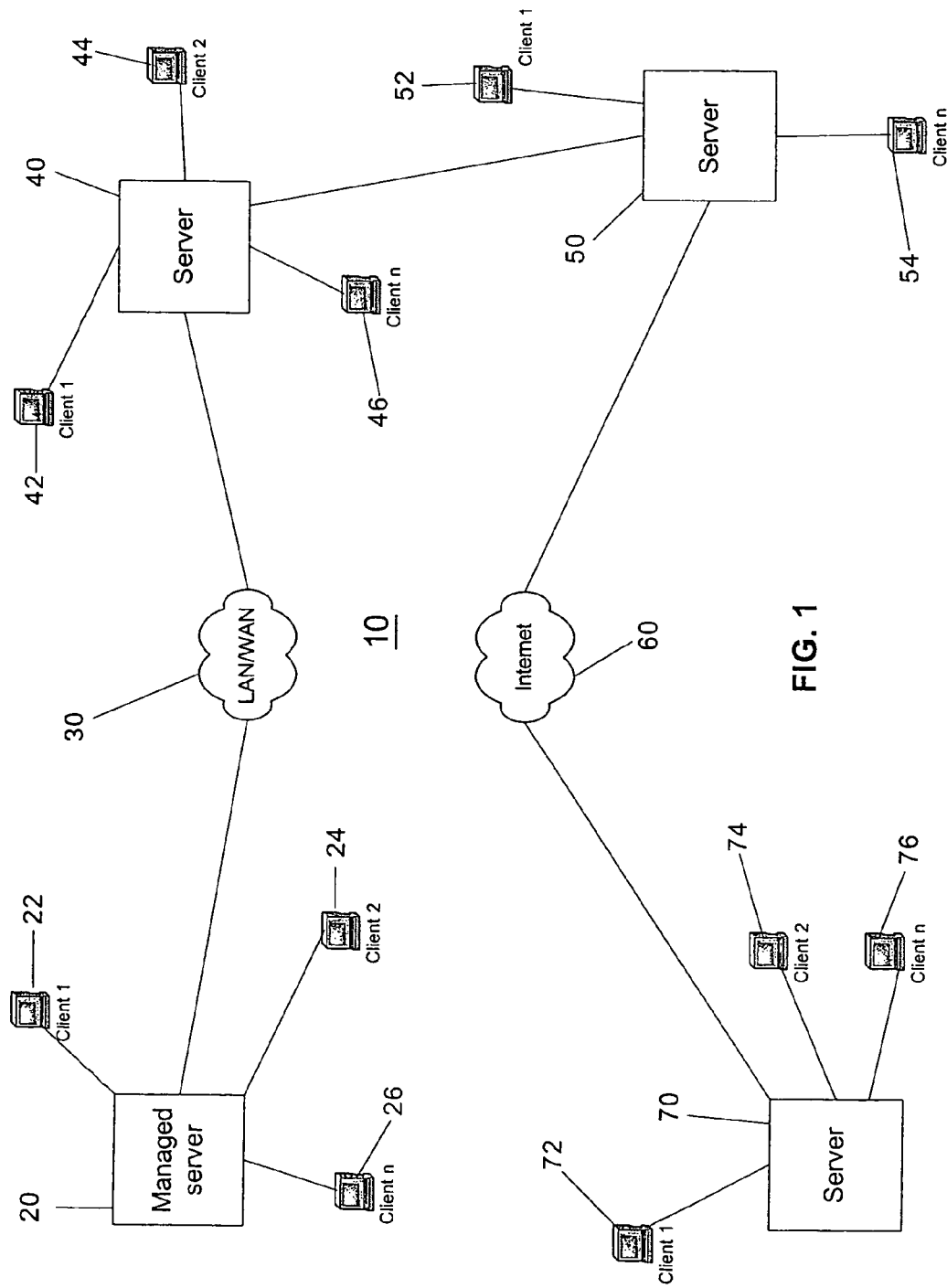
FIG. 1 is a block diagram illustrating an exemplary computer network system in which a remote server management controller of the present invention may be practiced.

Turning now to the drawings and referring initially to FIG. 1, a block diagram of an exemplary computer network system in which the present invention may be practiced is illustrated and designated using a reference numeral 10. The computer network 10 is intended to illustrate a typical modern computer network configuration with all its complexities and flexibility. A managed server 20 is connected to a plurality of client computers 22, 24 and 26. For purposes of explaining the present invention clearly, only one server on the network 10 has been designated as a "managed server." In practice, those of skill in the art will appreciate that the any or all of the servers in the network 10 could simultaneously include hardware and software devised according to the invention, making those servers "managed servers" as well.

The managed server 20 may be connected to as many as n different client computers. The magnitude of n is a function of the computing power of the managed server 20. If the managed server has large computing power (for example, faster processor(s) and/or more system memory) relative to other servers on the network, it will be able to effectively serve a relatively large number of client computers.

The managed server 20 is connected via a typical network infrastructure 30, which may consist of any combination of hubs, switches, routers and the like. While the network infrastructure 30 is illustrated as being either a local area network ("LAN") or wide area network ("WAN"), those skilled in the art will appreciate that the network infrastructure 30 may assume other forms such as a municipal area network ("MAN") or even the Internet.

The network infrastructure 30 connects the managed server 20 to server 40, which is representative of any other server in the network environment of managed server 20. The server 40 may be connected to a plurality of client computers 42, 44 and 46. The server 40 is additionally connected to server 50, which is in turn connected to client computers 52 and 54. The number of client computers connected to the servers 40 and 50 is dependent only on the computing power of the servers 40 and 50, respectively.

The server 40 is additionally connected to the Internet 60, which is in turn connected to a server 70. Server 70 is connected to a plurality of client computers 72, 74 and 76. As with the other servers shown in FIG. 1, server 70 may be connected to as many client computers as its computing power will allow.

Those skilled in the art will appreciate that neither the exact topology of the network illustrated in FIG. 1 nor the protocol of network communication (for example, Ethernet or any number of other common protocols) is a crucial aspect of the present invention. Moreover, the network topology shown in FIG. 1 is hypothetical and is shown only to explain the present invention with greater clarity by giving an example of a network environment in which the present invention is useful.

As explained in detail below, the present invention is illustrated as being deployed in a remote server management controller by way of example. The exemplary remote server management controller may be hosted in the managed server 20. The exemplary remote server management controller may be accessed via a remote console application program (or browser program) running on any of the client computers shown in FIG. 1.

For purposes of explaining the invention clearly, the remainder of this description is written with the assumption that the server 70 and clients 72, 74 and 76 are located in a remote administration site. The further assumption is made that a user (network administrator) located at the network administration site desires to use a remote console program running on one of the clients 72, 74 or 76 to establish a remote server management communication with the managed server 20. To accomplish this connection, the communication path between server 70 and managed server 20 must traverse the Internet 60, which is publicly accessible and prone to eavesdropping and snooping by hackers. After traversing the Internet 60, the communication path between the server 70 and the managed server 20 traverses servers 40, 50 and network infrastructure 30 in a typical manner before terminating at the managed server 20.

Figure 2:
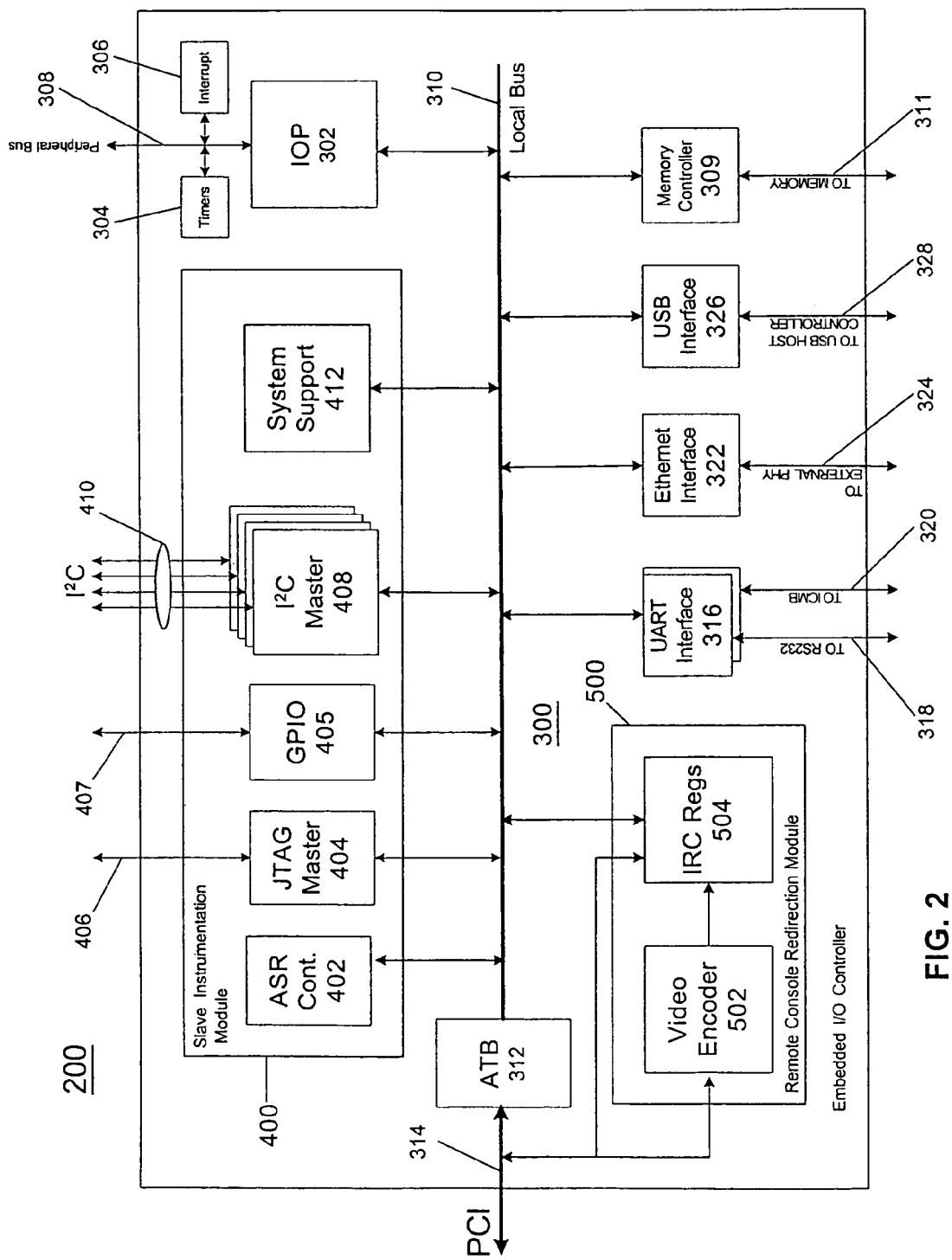
FIG. 2 is a functional block diagram of one embodiment of a remote server management controller constructed according to the present invention.

FIG. 2 shows a functional block diagram of one exemplary embodiment of a remote server management controller 200 constructed according to the present invention. The remote server management controller 200 may be implemented in a single application specific integrated circuit ("ASIC"). Alternatively, the remote server management controller 200 may be implemented in a plurality of integrated circuits or discrete components. Those skilled in the art will appreciate that implementation details such as deciding which functional aspects of remote server management controller 200 are implemented in a single ASIC or different ASICs are matters of design choice and not crucial aspects of the present invention.

The remote server management controller 200 may be implemented so that it is powered and capable of operation whether or not the managed server 20 (FIG. 1) is powered up (turned on) or online. Powering the remote server management controller 200 regardless of whether the host managed server is turned on allows the remote server management controller 200 to monitor, analyze and potentially intervene to correct the widest possible range of system problems that may befall the managed server 20 (FIG. 1).

The logic of the remote server management controller 200 is broken down into three main functional blocks. The first of these three functional blocks is an embedded I/O controller 300, which is essentially an independent computer system that is integrated within the managed server 20 (FIG. 1). The second and third functional blocks of the remote server management controller 200 are a slave instrumentation module 400 and a remote console redirection module 500. As described below, the embedded I/O controller 300 monitors and controls a wide range of conditions in the managed server 20 via the slave instrumentation module 400 and the remote console redirection module 500.

The embedded I/O controller 300 comprises an Input/Output processor ("IOP") 302, which provides general control and functions as a management processor for the remote server management controller 200. The IOP 302 may be implemented as a 32-bit RISC processor, but other processor implementations may be employed as well. The IOP 302 is operatively coupled to a timer module 304 and an interrupt controller 306 via a peripheral bus 308.

In one exemplary embodiment of the invention, a memory controller 309 is operatively coupled to the internal local bus 310. The memory controller 309 is, in turn, operatively coupled to dedicated memory via a memory interface 311. The dedicated memory may be battery-backed SRAM, SDRAM, ROM, NVRAM or any other appropriate type of memory.

The IOP 302 (located in the embedded I/O controller 300) is operatively coupled to the other functional modules (and many sub-modules) of the remote server management controller 200 via an internal local bus 310. Those of ordinary skill in the field will appreciate that the internal local bus 310 exists to allow communication between and among the logical components of the remote server management controller 200. The implementation details of the internal local bus 310 are a matter of design choice and not a crucial aspect of the present invention.

An address translation and bridging ("ATB") unit 312 is operatively coupled to the internal local bus 310 and to a PCI bus 314. PCI bus 314 is integral within and operatively coupled with the managed server 20 (FIG. 1). Preferably, the PCI bus 314, which serves as the main communication interface between the managed server 20 (FIG. 1) and the remote server management controller 200, may be configured as a 32-bit, 33 MHz PCI master/slave interface. In a typical system implementation, the remote server management controller 200 resides on the "compatibility" segment of PCI bus 314, but the PCI bus segment on which the remote server management controller is disposed is not a crucial aspect of the invention. The ATB unit 312 is constructed to allow the remote server management controller 200 to positively decode bus cycles on the PCI bus 314 and to communicate over the PCI bus 314 by initiating PCI bus cycles.

The embedded I/O controller 300 provides a plurality of communication interfaces that can be employed to establish communication sessions with the remote server management controller 200. One such communication interface is a UART interface module 316, which is operatively coupled to internal local bus 310. The exemplary UART interface module 316 comprises two standard 16550 UARTs, each of which may provide a separate serial communication interface between the remote server management controller 200 and the external world. Both UARTs are mapped into the address space of the IOP 302 and can be accessed via PCI bus 314 or by the IOP 302. Either UART may be implemented so that it can be reset through a control register in the address space of the IOP 302.

Outputs from the UART interface module 316 are typically routed to transceivers (not shown), where they may be converted into a wide variety of serial interface types. Examples of the types of serial interfaces that may be provided by the UART interface module 316 are a standard RS-232 interface 318 or an interface that complies with the Intelligent Chassis Management Bus ("ICMB") specification promulgated by Intel Corporation (ICMB interface 320). Those of ordinary skill in the field will appreciate that the RS-232 interface 318 may be used to connect to a wide range of industry standard modems, terminal servers, and the like.

Embedded I/O controller 300 further comprises an Ethernet interface 322, which is operatively coupled to the internal local bus 310. Ethernet interface 322 provides the main external communication interface between the remote server management controller 200 and the outside world. In the exemplary embodiment shown in FIG. 2, the integrated portion of the Ethernet interface 322 includes a MAC (Media Access Controller), inbound and outbound FIFOs, and a DMA engine to automatically transfer packets to and from memory. The Ethernet interface 322 requires a connection via interface 324 to an external PHY (not shown) and typical magnetic coupling to couple the PHY to the wire that serves as the transmission media.

Those skilled in the art will appreciate that a user may connect remotely to the remote server management controller 200 via the Ethernet interface 322. Such a connection may be made, for example, using a remote console application running on a client computer anywhere on the network that includes managed server 20 (FIG. 1). Moreover, the exemplary embodiment is capable of establishing secure communications between servers on the same network even when those servers are not connected to or by a publicly available data path such as the Internet. For purposes of clearly explaining the present invention, however, this description assumes that a remote user desires to establish a management communication session with the managed server 20 across the Internet 60 (FIG. 1). Those of ordinary skill in the field will appreciate that the Ethernet interface 322 may be configured to transmit and receive data according to the well-known TCP/IP protocol to allow the remote server management controller to be accessed via the Internet 60 (FIG. 1).

Embedded I/O controller 300 further comprises a USB interface 326, which is operatively coupled to the internal local bus 310. The USB interface 326 is connected to a USB host controller (not shown) via a USB host controller interface 328. The USB interface 326 is connected to one port of a USB host controller, which is typically located in a south bridge portion of the chipset of the managed server 20 (FIG. 1). When implemented in this way, the IOP 302 of the remote server management controller 200 may establish "virtual USB peripherals" that will be seen and recognized by any USB-aware OS or properly adapted system BIOS. These virtual peripherals may be presented to any USB-aware OS to allow communication with the OS in a common, OS-independent manner.

The next major functional block of the remote server management controller 200 is the slave instrumentation module 400. The primary purpose of the slave instrumentation module 400 is to provide the hardware infrastructure to implement control and monitoring functions in the managed server 20 (FIG. 1) as dictated by the IOP 302 in conjunction with dedicated application software such as remote console management software running on a client computer.

The slave instrumentation module 400 comprises an automatic server recovery ("ASR") controller 402, which operates to automatically respond to catastrophic failures of the managed server 20 (FIG. 1). The ASR controller 402 is operatively coupled to the internal local bus 310. The ASR controller 402 continually monitors whether the OS of the managed server 20 (FIG. 1) is operational by controlling a dead-man timer that requires periodic servicing by the OS. If the OS of the managed server 20 (FIG. 1) does not service the dead-man timer within a predetermined time, the ASR controller 402 resets the processor of the managed server 20 (FIG. 1) causing the managed server 20 (FIG. 1) to reboot.

A general purpose input/output module ("GPIO") 405 is provided in the exemplary embodiment of the slave instrumentation module 400. The GPIO provides a versatile communication interface that may be used for a wide variety of purposes.

The slave instrumentation module 400 also comprises a JTAG master 404. The JTAG master 404 is operatively coupled to the internal local bus 310. The JTAG master 404 comprises a standard JTAG interface 406, which is operatively coupled to a corresponding standard JTAG interface (not shown) on the motherboard of the managed server 20 (FIG. 1). Through the JTAG master 404, the remote server management controller 200 can perform a wide range of control functions on the managed server 20 (FIG. 1). These functions include updating or repairing the BIOS of the managed server 20 by reprogramming the nonvolatile memory where the BIOS resides.

The slave instrumentation module 400 further comprises an I²C master 408, which is operatively coupled with the internal local bus 310. The I²C master 408 has the capability of controlling a plurality of independent I²C serial channels 410. For purposes of example only, four (4) separate I²C channels are shown in FIG. 2. The I²C master 408 comprises a separate I²C engine for controlling each separate I²C channel.

The slave instrumentation module 400 additionally comprises a block of system support logic 412. The system support logic 412 is operatively coupled to the internal local bus 310. The system support logic 412 provides a variety of housekeeping functions for the managed server 20. Examples of these functions include providing the EISA bus ID, flash ROM support, ECC support, hot spare boot support, system post monitor support, floppy write protect, SMI base security measures, open hood detection and the like. In the exemplary embodiment, additional functionality described with reference to FIG. 3 is also disposed in the system support logic 412.

The third and final major functional block of the remote server management controller 200 is the remote console redirection module 500, which comprises a video encoder 502 and integrated remote console ("IRC") registers 504. The IRC registers 504 receive raw data snooped from the PCI bus 314. Under control of the IOP 302, some of the IRC registers 504 may function as a virtual communication device ("VCD") that may be used to intercept UART communications. Data intercepted through the VCD may be altered by the IOP and/or redirected to other outputs of the remote server management controller 200. For example, data intercepted by the VCD may be redirected to a remote user via the Ethernet interface 322.

Figure 3:
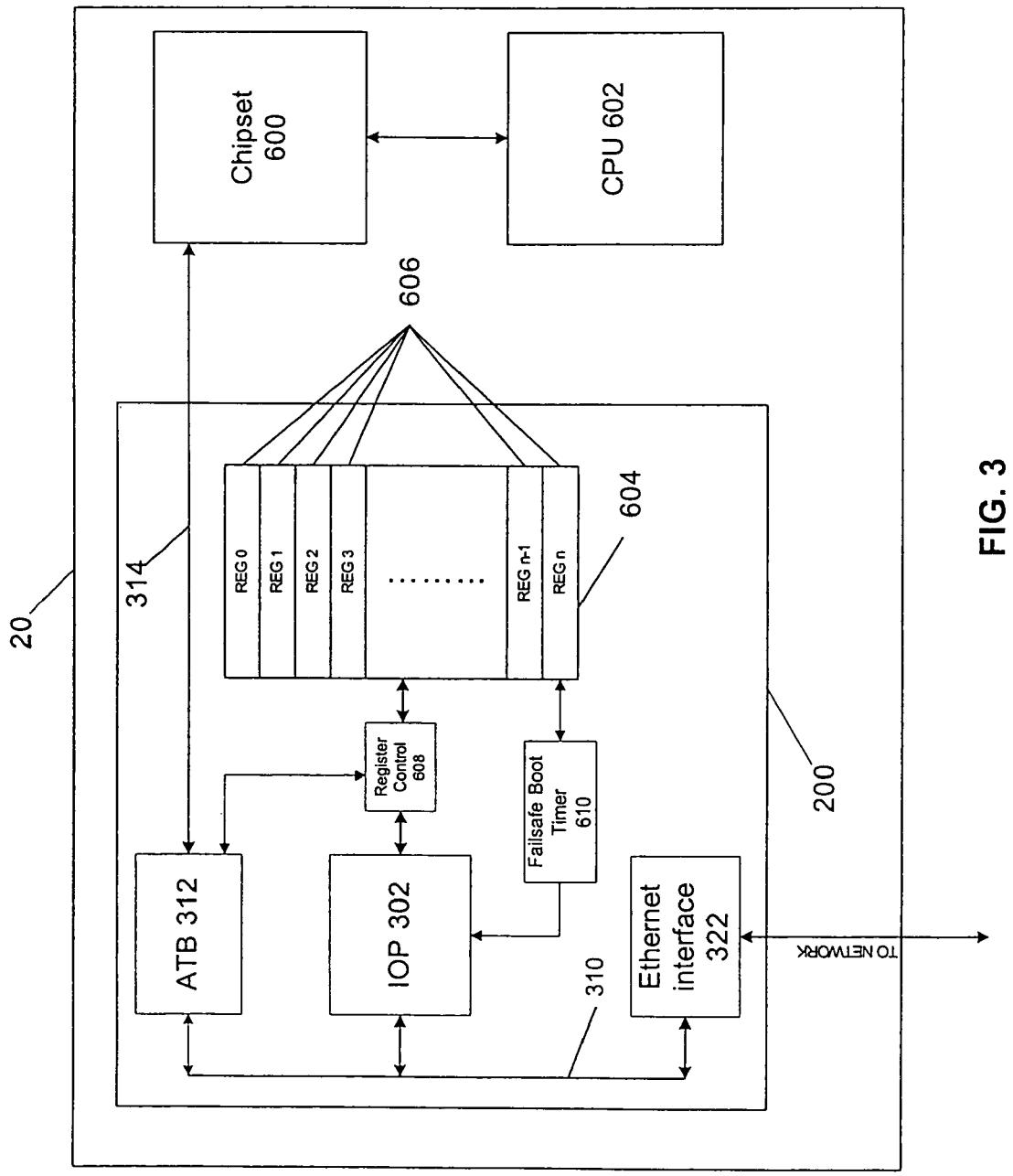
FIG. 3 is a functional block diagram showing the relationship of the register space of an IOP to the operating environment of a remote server management controller in a managed server.

FIG. 3 is a functional block diagram showing the relationship of the register space of the IOP 302 to the operating environment of the remote server management controller 200 in the managed server 20. The IOP 302 is associated with a register space 604, which comprises a plurality of individual registers 606. The IOP 302 communicates with the registers 606 via a register control interface 608, which is also operatively coupled to the ATB 312. The details of how data is exchanged between the IOP 302 and the registers 606 (and the specific contents of the registers 606) are not believed to be crucial aspects of the invention. The register space 604 is operatively coupled to a failsafe boot timer 610, which is further operatively coupled to the IOP 302.

The failsafe boot timer 610 is used during any booting of the IOP 302. For instance, after an auxiliary reset (first power up) the failsafe boot timer 610 is initiated, and if the IOP 302 is operational, it should disable the timer before it expires. If this does not happen, the IOP 302 is held in reset and protected registers are made modifiable via the PCI bus 314. This feature is useful as it allows an external user to gain control of the IOP in case the firmware of the IOP 302 is corrupted or missing.

The remote server management controller 200 functions as an independent computer within the managed server 20. The PCI bus 314 of the managed server 20 is populated with PCI devices such as a chipset 600, which provides supporting functions for a CPU 602 of the managed server 20 and is operatively coupled thereto. The PCI bus 314 is also accessible by the remote server management controller 200 via the ATB unit 312. Thus, the PCI bus 314 allows the remote server management controller 200 and the managed server 20 to communicate with each other. Without some form of security protection, the managed server 20 could access all memory locations of the IOP 302 that are accessible via the PCI bus 314. This would potentially allow access to sensitive data stored in the memory of the remote server management controller 200. A hacker could employ software executing on the CPU 602 of the managed server 20 to gain access to the sensitive data and use that data to gain access to secure data stored on the managed server 20 or elsewhere within the networked environment of the managed server 20.

Those of ordinary skill in the field will appreciate that individual registers 606 may be designed to perform specific functions to support the remote server management controller 200. For example, an individual register may be adapted to indicate an amount and/or location range of the memory space of the IOP 302 that is accessible by the managed server 20 via the PCI bus 314. Separate registers may be adapted to indicate different amounts and locations of accessible memory based on the type of the memory. For example, one register may indicate an amount and/or location of the ROM of the IOP 302 that is accessible via the PCI bus 314. Other registers may indicate amounts and/or locations of battery-backed NVRAM or IOP system RAM that may be accessed via the PCI bus 314.

The IOP 302 may store sensitive data that should not be accessible or modifiableexternal to the remote server management controller 200 in areas of memory that are not currently configured to be accessible via the PCI bus 314. Access to memory areas not specified by the appropriate registers via PCI bus 314 may be denied or at least restricted, to read-only for example. Locking areas of the memory of the IOP 302 prevents mischievous users such as hackers from flashing the operating ROM of the IOP 302 or otherwise gaining access to or modifying areas of memory containing sensitive data. In this manner, the memory space of the IOP 302 may be partially secured from intervention by hacker attacks or interference by other rouge software operating on the CPU 602 of the managed server 20.

However, locking the memory of the IOP 302 may prevent a member of the network management team from repairing the IOP 302 when it crashes or performing routine maintenance such as flashing the ROM of the IOP 302 to update the local firmware. Thus, a mechanism for overriding the locking of IOP memory locations may be desirable under certain conditions. One solution is to allow the managed server 20 to write to certain registers of the IOP 302, but only when the CPU 602 of the managed server 20 is in a special trusted mode, such as system management mode (SMM).

In the exemplary embodiment shown in FIG. 3, individual registers 606 may be adapted to belong to one of four register security classes shown in Table 1:

TABLE 1

Register Classes

| Register Class | | Description |
|---|---|---|
| 1 | (No Security) | Always accessible via PCI bus of managed server |
| 2 | (Low Security) | Accessible via PCI bus of managed server only when managed server is operating in a secure mode (for example, system management mode) |
| 3 | (Med. Security) | Accessible via PCI bus of managed server only if IOP first grants permission |
| 4 | (High Security) | Never accessible via PCI bus of managed server |

In addition to the security classes set forth in Table 1, additional security classes may be defined. One such additional security class may be a class of registers that are protected by a write-once bit in a control register associated with the IOP 302. Once the protection bit is written, these registers may not be modified until the IOP 302 is re-initialized.

Using the security classes set forth in Table 1, the register space of the IOP 302 may be classified based on the sensitivity of the data contained therein. Access to data that could not be used by a hacker for malicious purposes could be stored using no security (security level 1 in Table 1). Thus, this data would be subject to access via the PCI bus 314 of the managed server 20 any time during the normal operation of the remote server management controller 200.

Data requiring some degree of security could be accessible via information stored in registers of security class 2. Registers in security class 2 may be writable by the managed server only if the CPU 602 of the managed server 20 is in a trusted mode, such as system management mode.

Sensitive data requiring greater security may be accessible via information stored in registers of security class 3. The IOP may grant permission to write to registers in security class 3 via the PCI bus 314 by setting a predetermined bit or bits in a control register to a predefined state. The control register may be in a different security class, such as security class 4. The IOP 302 may deny permission to modify the registers in security class 3 via the PCI bus 314 by setting the predefined bit in the control register to a different predefined state. If permission to modify the registers in security class 3 is denied, the registers are locked from modification by the PCI bus 314. In the exemplary embodiment, the predefined bit or bits that control accessibility to registers in security class 3 may be changed by the IOP 302 at any time during normal operation. One exemplary control register may be defined as set forth in Table 2 below.

TABLE 2

Control Register

| Loc | Bit | PCI R/W | IOP R/W | Reset | Description |
|---|---|---|---|---|---|
| 31:24 | ACODE | R | R/W | 0 (PGOOD_AUX) | Attention Code - This is an 8-bit field that can be used to communicate status to the host system in event of an IOP failure. Additionally, since this is a non-volatile repository, the IOP firmware can use this field to |

TABLE 2-continued

Control Register

| Loc | Bit | PCI R/W | IOP R/W | Reset | Description |
|---|---|---|---|---|---|
| | | | | | communicate information to a software initiated reset event. |
| 23:17 | Reserved | R | R | 0 | Reserved |
| 16 | WDOG | R | Read/ Clear | 0 (PGOOD_AUX) | Watchdog Timer Expired - This bit indicates that the IOP has performed a watchdog reset since the last time this register was read. This allows the IOP to determine the cause of the reset event. Write a 1 to this bit location to clear. |
| 15:13 | Reserved | R | R | 0 | Reserved |
| 12 | MSTROV | R | R/W | 0 (PGOOD_AUX) | PCI Master Enable Override - This bit overrides a current setting of a master enable bit of an IOP PCI command register, allowing firmware to perform bus-master transactions against the will of the host operating system. The bit should only be set if the IOP can guarantee no side effects from its intrusion, or as a failure diagnostic tool. |
| 11 | PCIPROT | R | R/W | 0 (PGOOD_AUX) | PCI Register Protection - Following a PGOOD_AUX, all registers are read/writable from both interfaces. Once set, certain registers are protected from being modified through the PCI interface. Once set, this bit can only be cleared through the IOP interface. Additionally, this bit is cleared whenever the Failsafe boot timer expires. (But not when watchdog expires). This allows the PCI interface to regain control once the IOP enters a catastrophic failure mode. |
| 10 | PCIEN | R | R/W | 0 (PGOOD_AUX) | PCI Access Enable - When clear, all PCI accesses to all RMC functions are retried at the PCI interface. This condition is used to hold off PCI cycles to RMC until RMC has properly configured its BAR sizes and any other registers which need to be in place before the chip is interrogated from the PCI interface. The failsafe bootstrap timer serves as a failsafe mechanism to prevent a system hang condition if the IOP cannot boot enough to set this bit by setting this bit upon expiration. This bit is reset by PGOOD_AUX and does not get reset during watchdog or suicide resets. |
| 9 | FLUSHMAP | R | R/W | 0 (NB85E_RST) | Fast Flush Map Enable - When set, processor reads from $01FF_E000–$01FF_FFFF (upper 8k or 32 Meg SDRAM address space) will result in a zero wait-state access of indeterminate data. The processor can read from this region to flush corresponding cache lines before touching previously incoherent memory. By returning a constant value in this region, the processor read request can return as quickly as possible, drastically reducing the amount of time required to flush the line. When clear, accesses to $01FF_E000–$01FF_FFFF proceed to SDRAM as usual. Since RMC posts register writes, firmware should perform a dummy register read before touching the flush region whenever the state of this bit is changed. (Otherwise the memory read to the flush region may be performed before FLUSHMAP is turned on or off). |
| 8 | RUNMAP | R | R/W | 0 (NB85E_RST) | Runtime Map Enable - This bit changes the FlashROM decode |

TABLE 2-continued

Control Register

| Loc | Bit | PCI R/W | IOP R/W | Reset | Description |
|---|---|---|---|---|---|
| 7:4 | Reserved | R | R | 0 | ($0300_0000–$0380_0000) from CS4 to CS6. When set, CS4 is disabled. Reserved |
| 3 | RSTREQ | R/W | R/W | 0 (PGOOD_AUX) | IOP Reset Request - This bit is provided to allow the PCI interface to attempt to reset the IOP. A transition from 0 –> 1 will assert NMI to the IOP and activate the IOP failsafe boot timer. If the IOP is alive, it can decline or honor the request received from the NMI handler. If is wishes to decline the request, it disables the failsafe timer and clears this bit. If the IOP is unable to execute the NMI handler, the failsafe timer will eventually expire, placing the IOP in reset and unprotect all registers. (Clearing the PCIPROT bit in this register). This allows the system to regain control of a failed IOP without compromising security. |
| 2 | SUICIDE | R | R/W | 0 (PGOOD_AUX) | IOP Suicide Reset - IOP firmware can use this bit to perform a simulated "cold" boot of the I/O platform. When this bit transitions from 0 –> 1, an IOP_RESET is generated, similar to a watchdog expiration reset event. This bit is reset by PGOOD_AUX and will remain asserted to inform IOP bootstrap firmware that the reset event was intentionally induced. This bit is cleared before it can be set again. |
| 1 | ATTN | R | R/W | 0 (PGOOD_AUX) | Attention - This bit can be set by IOP firmware to request attention from the host system. This bit can be used to indicate diagnosable failure conditions to the host platform. (ROM checksum failure, etc.) |
| 0 | CPURST | Read/ Clear | n/a | 0 (PGOOD_AUX) | This bit indicates that the IOP has entered a catastrophic failure mode and is being held in reset. The PCI interface can only clear this bit (write a 1 to clear), but cannot set it. The IOP will enter this mode if it is unable to boot or reboot, (e.g. Flash failure). The system can attempt recovery by diagnosing and correcting the problem through the PCI interface, then clearing this bit. (e.g. low-level ROMPaq). |

Finally, the most sensitive data may be accessible based on information stored in registers of security class 4. These registers are never modifiable via the PCI bus 314.

Upon the beginning of its initialization sequence, the IOP delays access to all of its registers through the PCI bus 314 until initialization is complete. Prior to this, the remote management controller 200 may retry all attempts to access the registers (read or write). During the time before registers are available to the PCI bus 314, the IOP may lock registers subject to security class 3 by writing a predetermined bit or bits in a control register adapted to control access to the registers in security class 3. In this way, the system remote server management controller 200 prevents access to or modification of security class 3 registers before the IOP has had a chance to lock them.

As set forth above, access to data controlled by registers in security type 3 is strictly limited during normal operation of the IOP 302. In the exemplary embodiment, failsafe features exist to override this security under certain conditions. Inclusion of failsafe mechanisms to override the security normally provided by security class 3 is useful to permit repairs to be made on the IOP 302 if it fails catastrophically. This mechanism never guarantees access to the register space of the IOP 302 by a source external to the remote server management controller 302. The most rogue software could do is to request a reset in an attempt to gain access to secure registers, but a functional IOP 302 would be capable of denying this request.

Figure 4:
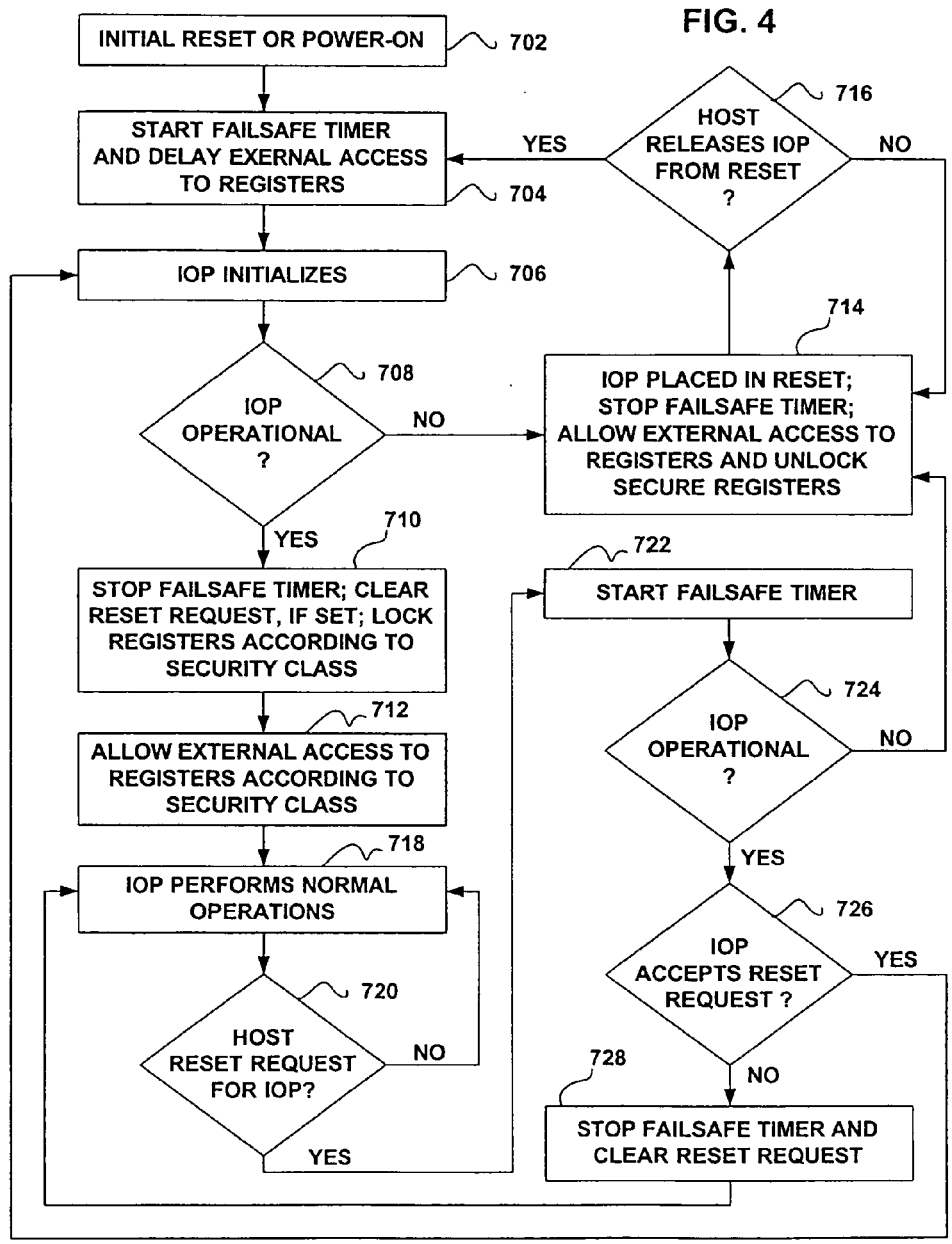
FIG. 4 is a flow diagram showing an exemplary reset request sequence.

FIG. 4 is a flow diagram showing an exemplary reset request sequence. The reset request sequence is generally referred to by the reference numeral 700. Upon an initial reset or power-on, the failsafe timer is started and external access to the registers is delayed. (Blocks 702 and 704). At 706, the IOP 302 undergoes an initialization and self-checking process. During this process, the registers remain unavailable for interrogation or modification via the PCI bus 314. Any access attempts will be temporarily delayed by retrying the cycle on the PCI bus 314 until the IOP 302 has either completed its initialization or entered a failsafe reset mode. Upon successful completion of the initialization process, the IOP is operational, so it stops the failsafe timer, clears any reset requests if set, and secures the registers associated with the IOP as determined by their register security class (see Table 1). (Blocks 708 and 710). Once the registers have been properly secured, the IOP 302 allows access to the registers according to security class. (Block 712). In other words, some registers may be read and written, some registers may be read-only, and some registers may be completely inaccessible.

However, if after the initialization process the IOP 302 is not operational, the IOP 302 is placed in reset, the failsafe timer is stopped, and external access to the registers is permitted, and any security, is unlocked. (Block 714). Thus, external access to the registers is possible. Once unlocked, the host processor 602 can reconfigure the system management controller 200 and examine its attached resources. If a failure is identified (e.g. a corrupted ROM image), the host processor 602 can attempt to repair or correct the failure and then re-initialize the system management controller 200. The IOP 302 remains in reset unless the host processor 602 releases the IOP 302 from reset. (Block 716). At this point, control switches back to block 704.

Of course, assuming the initial scenario, the IOP is operational, so it performs its normal functions. (Block 718). In the exemplary embodiment, however, a failsafe register is included as one of the plurality of registers 606. The failsafe register is writable via the PCI bus 314. When one or more predetermined bits in the failsafe register are set via the PCI bus 314, the IOP 302 is requested to reset itself. At 720, the IOP 302 receives a reset request originating from the host processor 602 via the PCI bus 314. A non-maskable interrupt ("NMI") is generated to the IOP 302 and the failsafe boot timer 610 starts a countdown of predetermined duration at 722.

If the IOP 302 is not operational (724), it will be unable to disable the failsafe boot timer 610 or clear the predetermined bits in the failsafe counter. In this case, the IOP 302 will be placed in a reset state (714), where it may await assistance from the host managed server 20 as discussed previously. Again, in the reset state, all IOP registers of security class 1, 2, and 3 are unprotected and may be written to via the PCI bus 314. In this manner, a user may regain control of the IOP 302 via the PCI bus 314 when the IOP 302 is not operational and unable to respond to a reset request. After receiving assistance from the managed server 20, the IOP may be initialized again at 704.

If the IOP 302 is operational (724), it may decline or honor the request to reset embodied by the NMI. For the IOP 302 to decline the reset request, it should disable the failsafe boot timer 610 before its countdown expires and clear the predetermined bit or bits that correspond to a reset request in the failsafe register (Blocks 726 and 728). Normal operation of the IOP continues, as shown at 718. If the IOP 302 honors the reset request at 726, it is initialized, as shown at 706.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. An electronic device, comprising:
   a processor; and
   a plurality of registers associated with the processor, the plurality of registers being adapted to be accessed by the processor, the plurality of registers being adapted to be placed in a locked condition in which access to the plurality of registers is prevented, the plurality of registers being adapted to be placed in an unlocked condition in which access to the plurality of registers is permitted, and wherein the plurality of registers is placed in an unlocked condition if the processor is placed in a reset condition.

2. The electronic device recited in claim 1, wherein the processor is adapted to be placed in the reset condition if the processor does not clear a processor reset request from a failsafe register and disable a failsafe boot timer before a countdown expires.

3. The electronic device recited in claim 1, wherein the processor is adapted to execute an initialization sequence and to place the plurality of registers in the locked condition as part of the initialization sequence.

4. The electronic device recited in claim 1, wherein at least one of the plurality of registers is placed in the locked condition unless a managed server associated with the processor is operating in a system management mode.

5. The electronic device recited in claim 1, wherein the processor is adapted to grant permission to access at least one of the plurality of registers.

6. The electronic device recited in claim 1, wherein the processor is adapted to decline a processor reset request.

7. The electronic device recited in claim 1, wherein the processor is adapted to access the plurality of registers via a communication interface.

8. The electronic device recited in claim 7, wherein the communication interface comprises a PCI bus.

9. The electronic device recited in claim 7, wherein cycles received via the communication interface are retried until the processor completes an initialization sequence.

10. The electronic device recited in claim 7, wherein cycles received via the communication interface are retried until the processor is placed in a reset state upon expiration of a failsafe boot timer.

11. An electronic device, comprising:
    a processor;
    a communication interface; and
    at least one register adapted to be accessed by the processor via the communication interface, the at least one register being adapted to be placed in a locked condition in which access to the at least one register via the communication interface is prevented, the at least one register being adapted to be placed in an unlocked condition in which access to the at least one register via the communication interface is permitted, and wherein the at least one register is placed in an unlocked condition if the processor is placed in a reset condition.

12. The electronic device recited in claim 11, wherein the processor is adapted to be placed in the reset condition if the processor does not clear a processor reset request from a failsafe register and disable a failsafe boot timer before a countdown expires.

13. The electronic device recited in claim 11, wherein the processor is adapted to execute an initialization sequence and to place the at least one register in the locked condition as part of the initialization sequence.

14. The electronic device recited in claim 11, wherein the at least one register is placed in the locked condition unless a managed server associated with the processor is operating in a system management mode.

15. The electronic device recited in claim 11, wherein the processor is adapted to grant permission to access the at least one register.

16. The electronic device recited in claim 11, wherein the processor is adapted to decline a processor reset request.

17. The electronic device recited in claim 11, wherein the communication interface is a PCI bus.

18. The electronic device recited in claim 11, wherein cycles received via the communication interface are retried until the processor completes an initialization sequence.

19. A method of authorizing access to a register, comprising the acts of:
- initializing a processor; and
- attempting to access at least one register associated with the processor, the at least one register being adapted to be placed in a locked condition in which access to the at least one register is prevented, the at least one register being adapted to be placed in an unlocked condition in which access to the at least one register is permitted; and
- authorizing access to the at least one register by placing the at least one register in the unlocked condition if the processor is placed in the reset condition.

20. The method recited in claim 19, further comprising the act of denying access to the at least one register.

* * * * *